Aug. 27, 1968  W. W. McCARTHY  3,399,031
METHOD OF CARRYING OUT CHEMICAL REACTIONS
AND PRODUCT THEREOF
Filed Aug. 17, 1965
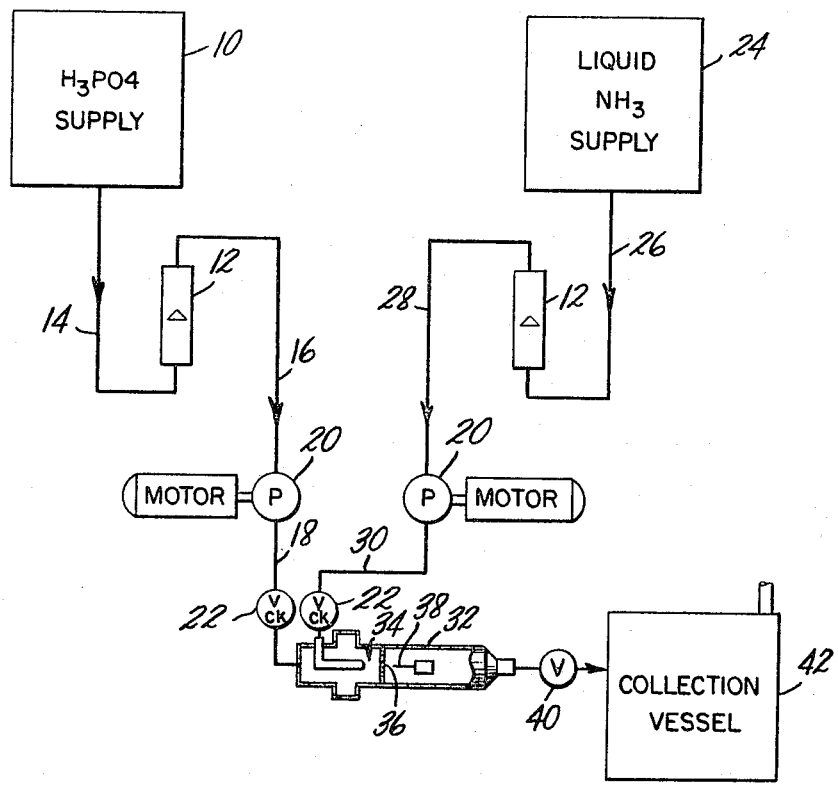
INVENTOR.
WILLIAM W. McCARTHY
BY
Eyre, Mann + Lucas
ATTORNEYS

United States Patent Office 3,399,031
Patented Aug. 27, 1968

3,399,031
METHOD OF CARRYING OUT CHEMICAL
REACTIONS AND PRODUCT THEREOF
William W. McCarthy, New Canaan, Conn., assignor to Sonic Engineering Corporation, a corporation of Connecticut
Filed Aug. 17, 1965, Ser. No. 480,379
12 Claims. (Cl. 23—107)

ABSTRACT OF THE DISCLOSURE

Chemical reaction between liquid reactants, one of which is normally a gas at atmospheric temperatures and pressures, is carried out by liquefying the gaseous reactant, combining the liquefied gaseous reactant with the other liquid reactant to form a composite thereof having the relative proportions of each required for the chemical reaction, the composite being confined in a pressure zone maintained at temperatures and pressures which preserve the liquefied state of the normally gaseous reactant, and then subjecting the composite to mixing energy of an intensity sufficient to generate cavitation in the composite, whereby the reaction rate and space-time yield of reaction product are greatly increased with minimization or elimination of the need for gas recycling.

---

This invention relates to a process for carrying out chemical reactions at extremely high velocities between liquid reactants at least one of which is a gas at atmospheric temperatures and pressures. More particularly, the invention pertains to effecting reaction of said reactants at reaction velocities which are substantially instantaneous due to the action of cavitation in a composite of said reactants in which all reactants are in the liquid state.

In the chemical industry many useful products are made by reactions in which one or more of the reactants is a gas at normal atmospheric temperatures and pressures and is reacted in that form with other liquid reactants. For example, certain easily liquefiable gases such as chlorine, sulfur dioxide, ammonia, nitrous oxide, carbon dioxide, ethyl chloride, propane, hydrogen sulfide, phosphine, etc., and other less readily liquefiable gases such as hydrogen, oxygen and carbon monoxide, are either actually or potentially useful as a reactant in the manufacture of commercial chemical reaction products. Brief examples of such manufacturing methods are the reaction between aqueous sodium carbonate solution and sulfur dioxide gas to form sodium bisulfite; the reaction between aqueous milk of lime suspension and chlorine gas to form the bleach, calcium hypochlorite; the reaction between ammonia and carbon dioxide gases to form ammonium carbamate which can be subsequently transformed to urea in the same system; and the reaction between ammonia gas and phosphoric acid to form mono- and di-ammonium phosphates.

In the foregoing reaction systems, the conventional practice generally is to pass the gaseous reactant through the liquid reactants as by counter-current flow in towers where the falling liquids mix with the rising gas or by bubbling the gas through more or less stationary volumes of the liquid reactants. In such conventional processes, it is virtually a necessity to provide means for collecting and recycling the gaseous reactants which unavoidably escape from the system due to the fact that the reaction velocity is not high enough to afford a complete reaction between all of the gaseous reactants and the liquid reactants within the available contact time therebetween, even though there may be a large excess of the liquid reactants beyond the stoichiometric proportion for complete reaction as is the fact when gas is bubbled through a large volume of liquid. Accordingly, in order for the gas-liquid reactions to be used economically to form industrial products, expensive recycling equipment must be often maintained and operated, and in any event the space-time yield of reaction product in most cases constitutes an imposed rather than desired limitation.

The present invention provides a novel process for carrying out reaction in normally gas-liquid reaction systems on a substantially instantaneous basis which affords substantially complete reaction and which either eliminates the need for recycling gaseous reactants or so greatly minimizes recycling as to achieve substantial economic savings. In the process of the invention, all gaseous reactants are first liquefied and then introduced into a pressure zone maintained at least under the minimum conditions of temperature and pressure which are necessary to preserve the normally gaseous reactants in the liquefied form. The normally liquid reactants are also introduced into the same pressure zone to form a composite of liquid reactants having the correct relative proportion of each reactant for the reaction that is desired to be carried out. Next, the composite is fed into a mixing zone where mixing energy is generated at a level sufficient to cause cavitation in the composite. As a result of such cavitation, substantially instantaneous high intensity mixing of the various reactants in the composite system is achieved whereby the reaction rate between the reactants is also increased and made substantially instantaneous.

The net result is that reaction product is formed virtually at the cavitation zone or immediately after the cavitation zone where a flowing stream of the composite of liquid reactants is used as in a continuous process. By the process of the invention the particular reaction involved is carried to substantial completion in so short an interval of time that very little, if any, of the gaseous reactants has any opportunity to remain unreacted and escape from the system as vapor. Furthermore, with reactions which have a high exotherm such as the ammonia gas-phosphoric acid reaction, there is no serious problem of heat control because the exotherm is liberated beyond the cavitation zone in an area where reaction product is being collected and where heat dissipation is easily provided for such as by simple exposure to the atmosphere or cooling environments.

The practical benefits provided by the process of the invention are increased space-time yield at lower operating cost, the space-time yield being equal to the rate of formation of reaction product for a given capacity of manufacturing equipment operated for a given time.

As mentioned above, it is necessary in the process of the invention to first convert all normally gaseous reactants for a particular reaction at hand into liquid form. The number of normally gaseous reactants may range from one to the total of all reactants as in the case of formation of ammonium carbamate and urea. Almost all of the normally gaseous reactants mentioned previously are available commercially in a liquid form and either such sources of supply can be used or liquefaction equipment can be installed for liquefying the gaseous reactants when obtained in the gaseous state.

The liquefied normally gaseous reactant is introduced into a pressure zone so that it may join with all of the other reactants to form a composite thereof as required for a particular reaction. Preferably, this is done on a continuous basis wherein flowing streams of the liquefied normally gaseous reactant and the other reactants are brought together in the pressure zone to form the composite of all reactants, with the rate of flow of each reactant being controlled in accordance with stoichiometric or other relative proportions that may be desired in the total composite. Such continuously flowing reactant streams in conjunction with certain forms of cavitation-producing equipment permit continuous process operation which gives the maximum spacetime yield.

The pressure zone must be maintained at least under the minimum conditions of temperature and pressure which will preserve the normally gaseous reactant in liquid form, and this is known information in the art for liquefiable gases so that it need not be itemized in detail here. By way of simple example, use of liquid ammonia as a reactant would require, with the pressure zone at room temperature (20° C.), a minimum pressure of about 8 atmospheres or about 125 p.s.i. to maintain the ammonia in liquid form in said zone.

After being formed in the pressure zone, the composite of all reactants is fed into a mixing zone where mixing energy is generated at a level sufficient to cause cavitation in the composite. The violent mixing action caused by cavitation of the composite reactants is preferably achieved by pumping the composite through an orifice to form a flat jet stream which is impinged upon the edge of a vibratory member. By impringing the jet stream on the vibratory member, violent mixing action results in the composite and in certain special circumstances, depending on the physical characteristics of the reactants, there may not be cavitation and yet some benefits of the present invention are achieved. By the foregoing specific technique, the process of the invention can be carried out continuously and at the same time since the jet stream is cavitated immediately after issuing from the high pressure zone, there is no problem of premature vaporazation of the liquefied normally gasous reactant.

The above-described cavitation of the composite of liquid reactants may be conveniently carried out by use of a device marketed by Sonic Engineering Corporation of Norwalk, Conn. under the trade name Sonolater. In this device, flowing liquid streams may be pressurized in a zone located on the upstream side of a small orifice through which the flowing liquids may be discharged with great force in the form of a jet stream and then immediately impinged upon the edge of a blade which vibrates and as a result violent mixing action occurs in the flowing liquids. Other forms of equipment may be used, however, to cavitate the composite of liquid reactants in accordance with the invention. For example, the composite of liquid reactants may be forced through two concentric cylinders each having slots in the sidewall and at least one being rotated at very high speeds sufficient to cavitate the flowing composite by the chopping, disruptive action of the slots as they move intermittently into and out of registration with each other. If desired, both cylinders can be rotated in counter directions, that is, one clockwise and the other counterclockwise, to increase the cavitational effect.

After the composite of liquid reactants has been subjected to cavitation, the resulting substantially completely formed reaction product is collected in any suitable manner, preferably as a continuous discharge from the cavitation zone. The reaction product may be discharged into the atmosphere or into liquids to form solutions or slurries, as may be desired. If heat dissipation is required, although this is not normally of concern, quenching or other cooling methods can be used as part of the collection operation.

For a further understanding of details of the invention and as a specific illustrative embodiment thereof, reference will be made to the accompanying drawing which shows a flow diagram for reacting liquid ammonia and phosphoric acid by the process of the invention.

As shown in the drawing, a supply 10 of concentrated phosphoric acid is connected to flowmeter 12 which indicates the rate of flow of the acid as it is pumped through lines 14, 16 and 18 by metering pump 20. Line 18 is provided with a check valve 22 for added control and flexibility.

Similarly, a supply 24 of ammonia in liquid form is provided with its own delivery system of flowmeter 12, metering pump 20, check valve 22 and lines 26, 28 and 30.

Lines 18 and 30 lead into a Sonolator device 32, previously mentioned and illustrated schematically in the drawing, which includes the high pressure zone 34, orifice 36 and blade 38 positioned adjacent and in alignment with the orifice. The Sonolator 32 discharges through a back pressure valve 40 into the collection vessel 42 which is vented to the atmosphere, and for best results is usually operated with a pressure drop of about 200 p.s.i. across the orifice, from the upstream to the downstream side. However, greater pressure drop can be used depending on the particular reactants being treated.

In carrying out a continuous process in accordance with the flow diagram of the drawing, concentrated phosphoric acid of about 85% $H_3PO_4$ concentration, is continuously introduced into the high pressure zone 34 of Sonolator 32. Likewise, liquid ammonia is continuously introduced in liquid form into high pressure zone 32. At atmospheric temperatures, the pressure in zone 34 is maintained at about 500 to 1000 p.s.i. in order to preserve the liquid form of ammonia introduced therein and also to provide the driving force for moving the liquid streams through the Sonolator. The back pressure valve 40 is adjusted to provide a pressure of about 300 to 800 p.s.i. on the downstream side of orifice 36 to achieve a pressure drop of about 200 p.s.i. across the orifice, as previously stated.

The rates of flow of the phosphoric acid and liquid ammonia streams are adjusted in accordance with the reaction product that is desired. For example, if monoammonium phosphate is to be made, the rates of flow in parts by weight per unit time will be about 17 parts ammonia and about 115 parts of the 85% phosphoric acid (equal to 98 parts 100% $H_3PO_4$). If diammonium phosphate is desired, then the ammonia rate of flow will be about twice as large, that is, 34 parts per 115 parts of the 85% phosphoric acid.

In any case, a composite of both liquid reactants is formed in the pressure zone 34 on the upstream side of orifice 36. The composite is expelled with great force and velocity through the orifice 36 and issues forth therefrom in the form of a thin jet stream which immediately impinges upon the aligned edge of blade 38. This induces the blade 38 to vibrate and as a result cavitation and high intensity mixing action take place in the jet stream of the composite of liquid reactants as the jet stream emerges from the orifice 36 and passes by blade 38. Thus, the entire area between the orifice 36 and blade 38 becomes a cavitation zone wherein the composite of liquid reactants is subjected to cavitation and intense mixing action, causing substantially instantaneous intermixing and reaction of the liquid reactants. The thus formed reaction product discharges through back pressure valve 40 into the collection vessel 42.

In a further embodiment of the invention, the procedural steps of the above described reaction are repeated for the reactants liquefied ammonia and concentrated nitric acid to form ammonium nitrate. The proportions used are by weight about 17 parts liquefied ammonia and about 63 parts nitric acid based on a 100% concentration and the pressures are the same as before, that is, about 500 to 1000 p.s.i. on the upstream side and about 300 to 800 p.s.i. on the downstream side of orifice 36.

In another embodiment of the invention, reaction is carried out according to the above described procedure between liquefied sulfur dioxide and sodium carbonate solution. The proportions are about 182 parts of liquefied sulfur dioxide and about 1500 parts of a 40% solution of washing soda which is the decahydrate of sodium carbonate. The pressures used are about 300 to 400 p.s.i. on the upstream side of orifice 36 and about 100 to 200 p.s.i. on the downstream side.

At these lower operating pressures, in still another embodiment of the invention, liquefied butene-1 can be sulfonated by reaction with concentrated sulfuric acid. The proportions used by weight are about 56 parts of liquefied butene-1 and about 98 parts of concentrated sulfuric acid.

In a final illustrative embodiment of the invention, liquefied chlorine is reacted according to the above described procedures to form monochlorobenzene. The proportions by weight are 78 parts of liquefied chlorine and about 71 parts of benzene, and the operating pressures are about 500 to 1000 p.s.i. on the upstream side of orifice 36 and about 300 to 800 parts on the downstream side.

The foregoing overall pressure ranges of about 300 to 1000 p.s.i. on the upstream side and about 100 to 800 p.s.i. on the downstream side of orifice 36 are illustrative based on the particular reactions described, and other substantially higher pressures on one or both sides of the orifice can be used for carrying out reactions according to the invention.

While the invention has now been described in specific terms of reaction between liquid ammonia and phosphoric acid to produce ammonium phosphates and in terms of the further specific illustrative embodiments described above, it will be evident that the principles of operation and the advantages of the invention apply in general to systems involving reaction between liquid reactants one or more of which is a gas at atmospheric temperatures and pressures.

It will be understood that it is intended to cover all changes and modifications of the preferred embodiments of the invention, herein chosen for purposes of illustration, which do not constitute departures from the spirit and scope of the invention.

What is claimed is:

1. A process for effecting chemical reaction between liquid reactants at least one of which is normally a gas at atmospheric temperatures and pressures which comprises the steps of liquefying the normally gaseous reactant, introducing said liquefiied gaseous reactant and at least one other liquid reactant into a pressure zone maintained under those conditions of temperature and pressure which preserve said liquefied gaseous reactant in the liquid state, said reactants being introduced into said pressure zone in predetermined relative proportions to form a composite of the reactants capable of interacting according to the desired chemical reaction, and subjecting said composite to mixing energy of an intensity sufficient to generate cavitation in said composite.

2. A process as in claim 1 which includes the steps of forming said composite of reactants into a jet stream and impinging said jet stream against a vibratable member with sufficient force to induce said member to vibrate at an intensity which provides said mixing energy.

3. A process as in claim 2 wherein said cavitation is carried out in a zone separate from said pressure zone, said separate zone being maintained at a pressure greater than atmospheric pressure but less than the pressure in said pressure zone.

4. A process as in claim 3 wherein reaction product formed in the cavitation zone is discharged to the atmosphere.

5. A process as in claim 3 wherein reaction product formed in the cavitation zone is discharged into a liquid.

6. A process as in claim 1 wherein all of the reactants in said composite are liquefied normally gaseous reactants.

7. A process for effecting chemical reactions between liquid reactants at least one of which is normally a gas at atmospheric temperatures and pressures which comprises the steps of liquefying the normally gaseous reactant, introducing said liquefied gaseous reactant and at least one other liquid reactant into a pressure zone maintained under those conditions of temperature and pressure which preserve said liquefied gaseous reactant in the liquid state, said reactants being introduced into said pressure zone in predetermined relative proportions to form a composite of the reactants capable of interacting according to the desired chemical reaction, expelling said composite from the pressure zone in the form of a thin jet stream into a cavitation zone, cavitating said jet stream substantially instantaneously and immediately after it exits from said pressure zone by impinging said jet stream upon a vibratable member with sufficient force to induce said member to vibrate at an intensity which generates cavitation in said jet stream, and discharging reaction product formed in said cavitation zone for collection thereof.

8. A process as in claim 7 wherein said reactants are liquefied ammonia and concentrated phosphoric acid.

9. A process as in claim 8 wherein the pressures in said pressure zone and said cavitation zones are from about 300 to about 1000 p.s.i. and from about 100 to about 800 p.s.i. respectively.

10. A process as in claim 7 wherein the introduction of reactants into the pressure zone and all subsequent steps are carried out on a continuous basis.

11. A process as in claim 7 wherein said reactants interact by exothermic chemical reaction and wherein said reaction product is cooled after discharge from the cavitation zone.

12. A process for effecting chemical reaction between liquid reactants at least one of which is normally a gas at atmospheric temperatures and pressures which comprises the steps of liquefying the normally gaseous reactant, introducing said liquefied gaseous reactant and at least one other liquid reactant into a pressure zone maintained under those conditions of temperature and pressure which preserve said liquefied gaseous reactant in the liquid state, said reactants being introduced into said pressure zone in predetermined relative proportions to form a composite of the reactants capable of interacting according to the desired chemical reaction, forming said composite into a jet stream and impinging said jet stream upon a vibratable member with sufficient force to induce said member to vibrate at an intensity provides violent mixing energy and action in said jet stream.

References Cited
UNITED STATES PATENTS

| | | | |
|---|---|---|---|
| 1,992,938 | 3/1935 | Chambers et al. | 23—252 |
| 3,153,578 | 10/1964 | Taylor | 23—260 |

OSCAR R. VERTIZ, *Primary Examiner.*

L. A. MARSH, *Assistant Examiner.*